March 27, 1956 — D. J. PLEDGER ET AL — 2,739,519
TILLER BLADE AND STANDARD
Filed Dec. 5, 1951 — 2 Sheets-Sheet 1
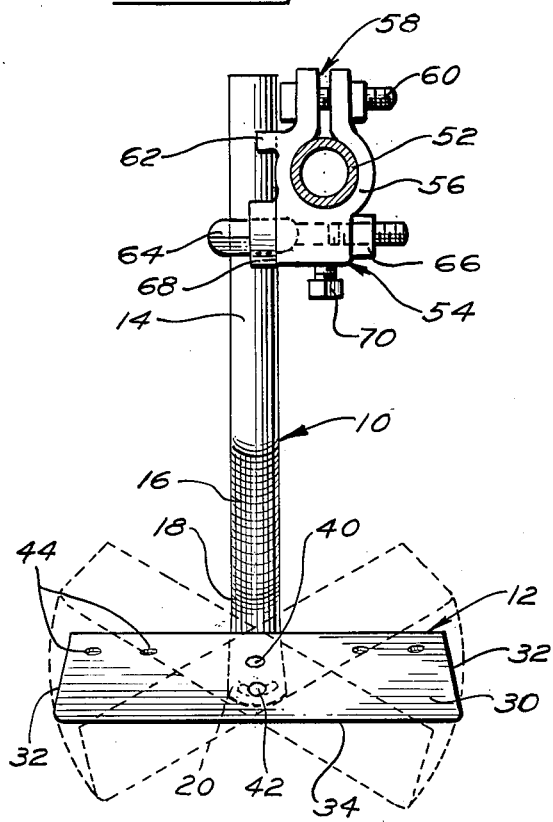
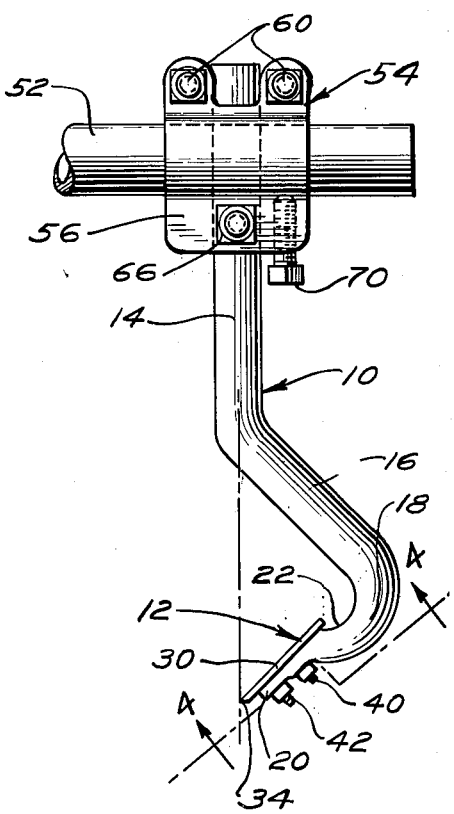
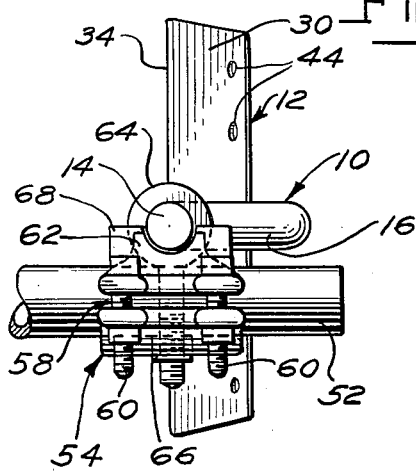
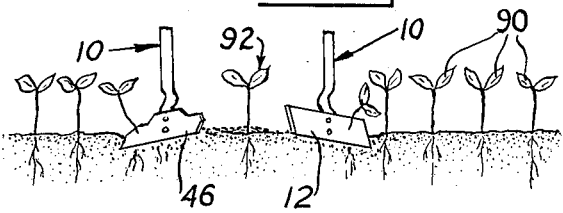
INVENTORS
Dennis Jay Pledger
Dennis Jay Pledger, Jr.
BY Brown, Jackson, Boettcher & Dienner
ATTORNEYS March 27, 1956  D. J. PLEDGER ET AL  2,739,519
TILLER BLADE AND STANDARD
Filed Dec. 5, 1951  2 Sheets-Sheet 2
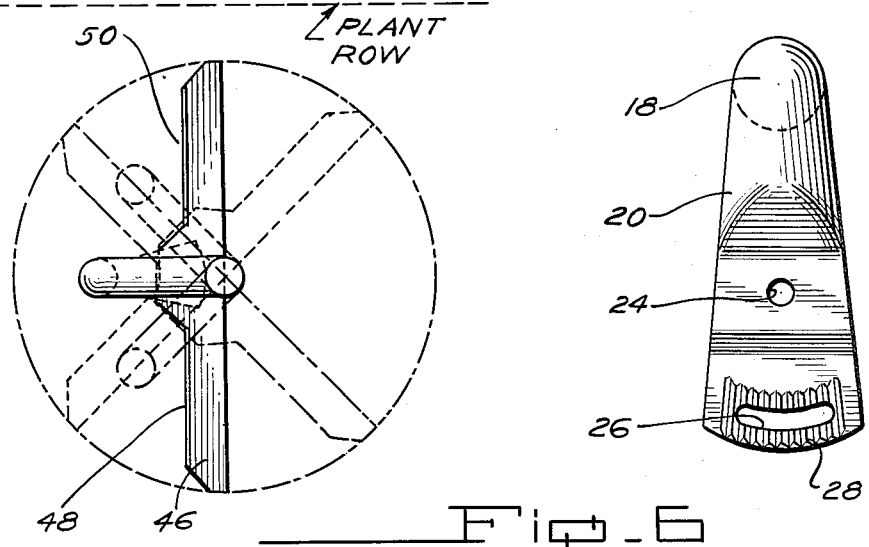
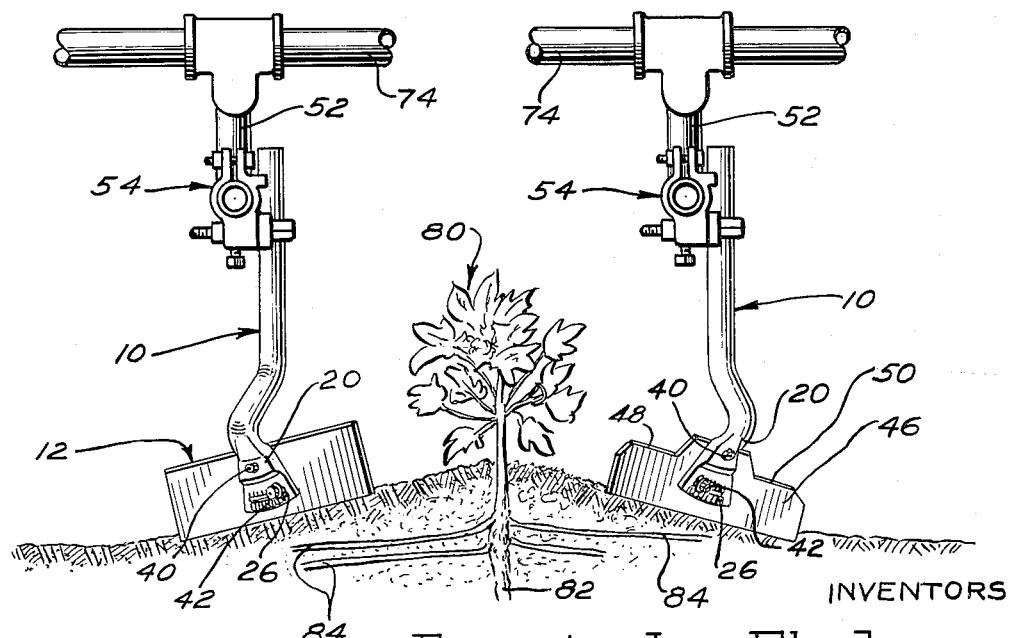
INVENTORS
Dennis Jay Pledger
Dennis Jay Pledger, Jr.
BY Brown, Jackson, Boettcher & Drenner
ATTORNEYS

United States Patent Office 2,739,519
Patented Mar. 27, 1956

2,739,519

TILLER BLADE AND STANDARD

Dennis Jay Pledger and Dennis Jay Pledger, Jr., Shelby, Miss.

Application December 5, 1951, Serial No. 259,962

5 Claims. (Cl. 97—198)

The present invention relates to cultivators and particularly to cultivator or tiller blades or plows for the cultivation of row crops.

Cultivation has long been recognized as essential to the successful production of crops. The main purpose of cultivation is to destroy all plant life other than the crop plants, so that the entire nutrient of the soil and surrounding atmosphere may be absorbed by the crop plants rather than to have the crop plants robbed of vitality by noxious weeds and useless plant growth.

An object of the present invention is to provide means for effectively accomplishing the main purpose of cultivation without injury to or needless destruction of crop plants.

The common plants of forest, meadow and farm are complex life forms, having many parts and organs which perform functions essential to the life, growth and character of the plants. Basically, the common plants have a root system and a leaf system. During the life of the plants, a natural and perfect balance exists between the two systems. Accordingly, growth of one system is accompanied by a corresponding growth of the other and injury to one system results in a retardation of growth or death of a portion of the other. It will be appreciated, therefore, that nothing should be done to the plant that will be harmful to either system thereof.

Heretofore, while the basic precepts set forth have been recognized by many farmers, the cultivation of crops has been conducted in such manner as to effect injury to the crop plants and particularly to the root system thereof, so that the intended beneficial effects of cultivation have been negated by such injury to the crop plants. In the case of farmers who do not know, or who refuse to recognize the structure and natural balance of plant life, improper cultivation is principally the result of ignorance and stupidity. In the case of some of the farmers who do recognize the structure and natural balance of plant life, improper cultivation is the result of use of alleged cultivating tools, that actually are not adapted for cultivation purposes, and the use of those tools in the manner recommended by the tool manufacturer, which recommended use disregards the structure and natural balance of plant life. In many cases, the tool manufacturers and/or the users of the tools attempt to explain away the improper cultivation effected as an endeavour on their part to vary the growth of the systems of the plant according to their dictates. Such explanation is somewhat ridiculous in view of the known fact that the plants and their constituent systems will naturally seek the nutrients essential to their continued existence. For example, many farmers will explain deep cultivation as an endeavour to make the root system of the crop plants seek a lower, moist soil level when the weather is dry or as an endeavour to let moisture pentrate to the roots or to drain away when the weather is wet. In both instances, however, the deep cultivation results in a severing of portions of the root system of the crop plants with a resulting stunted growth of the leaf system and the plant fruit. In contradiction to this explanation is the fact that the plant roots will grow toward moisture if the plant requires moisture and will grow away from moisture if the moisture content of the soil is in excess of that required by the plant. Accordingly, as stated, the explanation is ridiculous and contrary to fact. The plant will naturally seek its essential nutrients and to sever the nutrient seeking organisms of the plant is to defeat the purpose of cultivation.

While a great many farmers are well aware of all of the foregoing, they are still unable to effect proper cultivation of their crop plants because of the lack of tools for effecting proper cultivation. In hand cultivation, such as hoeing, proper cultivation can be obtained, but is very difficult due to the human element. Proper hand cultivation requires experienced, conscious, conscientious laborers, which are very scarce, and even with such skilled hand labor, much damage can readily occur. With machine or animal driven tools, such as well known conventional plows, the tools are designed for deep plowing and, regardless of the adjustment thereof, will continue to seek a deep level during plowing with consequent damage to the root systems of the crop plants.

An object of the present invention is to provide an improved cultivating tool adapted for use with machines to accomplish proper cultivation in an economical and convenient manner.

The tools of the present invention are adapted for the cultivation of all row crops, check row planted crops and individual hill crops but are particularly adapted for the cultivation of cotton. In view of this particular adaptability, the following description is directed especially to the cultivation of cotton, it being understood, however, that reference to cotton tillage is exemplary and not necessarily restrictive. While cotton is actually grown in hills, that is, grown with each plant stand in an individual hill separated a substantial distance from other plant stands, the seeds must be planted in drills or continuous rows due to the lack of mechanical means for properly metering cotton seeds and the lack of an effective check row planter for cotton seeds. Accordingly, as the plants grow, cross cultivation or chopping must be carried out to destroy the excess cotton plants, to define the individual plant hills and to provide a uniform stand of cotton plants.

During growth, the cotton plant develops a tap root, a plurality of large arterial laterals extending from the circumference of the tap root, numerous tertiary laterals and a massive network of thread roots extending from the laterals. The tap root is a continuation of the main plant stem and extends substantially vertically downward to indeterminate depths to form a support for the plant. The areterial laterals are usually three to seven in number and constitute the main feeding channels of the root system. The arterial laterals hereditarily spring from the circumference of the tap root within the first six inches below the surface and extend radially therefrom to a length of three to ten feet to assist in supporting the plant. In the cotton planting states, the initial period of growth of the plants is usually a moist season so that the root system seeks a level close to the earth's surface, there being no necessity for deep rooting since the amount of moisture necessary to the survival and continued growth of the plant is readily obtained near the surface. Later in the season, during arid periods, the root system seeks a lower level to find the necessary moisture. However, the level of the arterial laterals, into which the root system feeds, and the level of the conduit portions of the feeding roots is very close to the surface, usually within two inches of the surface, and extending toward adjacent plant hills. Accordingly, it will be appreciated that cultivation to a depth of two inches or more will result in a severing of vital portions of the root feeding system with consequent retardation or absence of growth of the fruit bearing portions of the leaf system of the plant. Accordingly, cotton must be cultivated to a depth of less than two inches.

From the foregoing, it will be appreciate that the purpose of cultivation is not the destruction of the crop plant root systems, but mainly the removal and destruction of undesirable plant growth. Plant growth is stopped by physical cultivation in three ways, by uprooting the undesirable plants, by severing the root system of the undesirable plants and by smothering the undesirable plants. Physical cultivation is a highly practical manner of destroying undesirable growth in cotton stands. An additional advantage and desirable feature of physical cultivation is the production of a mulched surface on the field. Undesired plant growth can be destroyed by uprooting same, but uprooting requires deep cultivation which results in damage to the crop plants and which, accordingly, is to be avoided.

An object of the present invention is to provide a tilling tool adapted for shallow cultivation for severing undesirable plant growth between crop plant rows and between plant hills, for dirting up or smothering undesirable plant growth in the crop rows or hills, for cross cultivating row crops to produce an even crop stand and to establish individual plant hills, for shallow cultivating to a depth less than the depth of the root system of the crop plant and to produce a mulched surface on the crop plant field.

In the production of cotton, the seeds are planted in drills, as pointed out hereinbefore. As the leaf systems of the plants initially emerge from the ground, the continuity of the drills is checked for uniformity of growth. If desired, additional planting may be carried out at this time to fill in blank spots. After the complete drill stand has emerged, row tilling or cultivating is carried out to loosen the soil between drills, to kill undesirable plant growth between drills by severing same and to dirt up into the drills, beneath the cotton plants, to smother undesirable growth in the drills. After the plants have attained a definite growth, but prior to establishment of a substantial root system, chopping or cross plowing is carried out to remove excess cotton plant growth. That is, plows or the like are run across the drills to plow out or remove definite spaces of the drills to leave a uniform stand of plants on the field, each stand in a separate hill and spaced a substantial distance from other plant stands. For example, a recommended relationship, as will be pointed out and explained hereinafter, is to sow the seed in drills spaced forty inches apart and to cross plow thirty-three inch swaths across the drills, the swaths being spaced five to six inches apart. When such relationship is adhered to, the field will have a uniform stand of plants, each stand spaced thirty-three and forty inches from its neighbors, respectively. While additional planting may be carried out before cross plowing, it is preferred that the continuity of the stand be checked after plowing and additional planting carried out then to fill in missing hills. After cross plowing and replanting, tilling may be carried out by row cultivation and cross cultivation.

It has been customary to utilize hand chopping to accomplish the effect of cross plowing and to utilize manual labor in the cultivation of the soil, except possibly for row tilling. Due to many factors, notably, labor's rebellion at the irksome task of hand weeding row crops, the long hours and low pay, the advent of the farm tractor and widespread social and economical changes, it has become difficult and unprofitable for farm owners to cultivate cotton and certain other crops by the old hand method. Farmers are desperately seeking other methods of weed control in row crops. Many methods have been tried, but none has proven satisfactory. Moreover, these methods hold little promise of being a solution to row crop weed control. There is, however, one definite method of mechanical weed control in row crops whereby the need for hand labor is reduced to the barest minimum, that is, check row or cross cultivation.

Check row planting and cultivation of plants is not new; it doubtless originated soon after mankind began arranging selected plants in parallel rows. Certainly no one will dispute that the method has been known and used by farmers for a very long time. Even so, it has never attained widespread acceptance and use. Actually, the practice seems to be used less today than it was fifty years ago. Planting cotton seed thickly in drills and then cross plowing the field after the plants emerge is a practice of fairly recent origin and is gaining in popularity, yet is not a general practice. This is regrettable, because, however attained, whether by check planting or cross plowing, the arrangement of plants in regular squares or rectangles is the one definite way to reduce the area where hand labor is required in the control of unwanted vegetation. Obviously then, if less hand labor is used, the cost of production is reduced, resulting in greater profit.

This raises the question, if there is more profit in cotton which is produced by cross cultivation, then why isn't the method more widely used? The reactions have been numerous and varied. The most frequent objection to cross cultivation is the difficulty most farmers experience in maintaining a stand. Many agree that a cotton field can be cultivated much cheaper by cross plowing, but they contend the saving thus gained does not compensate for the lowered yield resulting from the poor stand caused by cross tillage. The reason for the poor stands so frequently observed following cross plowing is not the fault of the method; to the contrary, it is entirely the result of the means employed. This is due partly to a lack of knowledge, and mostly due to the fact that the correct plow has not been made available to farmers.

Small winged sweeps, that are generally used on tractor cultivators at present, are made very flat with a long tapered wedgelike point. When these are forced into the soil they produce a lifting effect. In cultivating seedling cotton the first time, they are usually run fairly close to the plant drill, which leaves a narrow list of more or less bonded soil. If the plows nearest the drill chance to strike a buried cotton stalk, root wad, or other coarse field trash, or if the points of the sweeps are forced under such material, the narrow drill list including the cotton plants may be lifted or displaced, thereby injuring the stand. Frequently such lifted coarse trash lodges between the two drill plows and may be dragged down the row, killing all the young plants for several feet or yards, before it is discovered and removed.

After plowing a field in the direction of the drill, a common practice is to turn and cross plow using the same outfit and setting. (A tractor cultivator equipped with numerous small winged sweeps.) That is when many good stands have been utterly ruined, and many fair stands have been so depleted that the cotton crop becomes a liability. The reason for this is that the winged sweep is an excellent wedge, and when forced in and across the narrow bonded drill ridge, by cross plowing, a tremendous cleavage effect is applied, which results in several feet of the drill ridge with all the plants being lifted and pushed out into the row middles so that the plants are killed and the stand ruined. While the winged sweep is probably the worst offender, it is not alone. Any other plow that produces a lifting effect is undesirable and those which exert a straight lateral thrust, bulldozer fashion, will also ruin a stand. The adverse effect on stand is greatly increased following middlebuster breaking, since in this manner of breaking, the crop plant seedlings are rooted in a thin layer of top soil which is bonded within itself, but is not bonded to the unbroken subsoil, because the two masses of earth are separated by the concentrated layer of field trash usually present following that kind of breaking. Many farmers realize that a stand cannot be maintained when cross plowing the first time with conventional sweeps. They have tried other well known implements, but with little success.

We have found that the only way to preserve a good stand of cotton when cross plowing the first time, is by the use of some tool or implement which applies a down thrust while crossing the drill ridge. The ideal tool should exert a downward lateral thrust away from each hill, and produce a shallow, sloping slicing cut across the drill ridge leaving the crop plants and their roots entirely uninjured. This discovery resulted in the development of the present invention, an object of which is to provide cultivating tools accomplishing the defined functions.

It is widely known that most substances cannot be sliced, even with the sharpest knife, by merely applying pressure to the knife which is held in contact with the substance. If, however, a slight pressure is exerted and the knife is drawn across the substance, slicing becomes easy. A similar condition obtains in moving earth. Not so pronounced possibly, but the difference is in degree and not kind. A draw pull or slicing effect has been widely used in the shear of moldboard breaking plows and in disk breaking plows, but, so far as we know, the principle has never been successfully used in cultivating plows. It is an object of the present invention to provide strong and dependable means for utilizing the slicing action of the draw cut of a knife in shearing unwanted vegetation just beneath the surface of a field of row crops and at the same time leaving the surface with a beneficial mulch.

In view of the foregoing, it will be apparent that mechanical tilling is by far less expensive than manual labor and that many farmers tend toward the accomplishment of cross plowing and tilling in both directions by mechanical means. However, mechanical tilling, until this time, could not be satisfactorily accomplished due to the lack of proper tools and machines, as pointed out hereinbefore. Accordingly, farmers have been forced to rely on manual labor to a great extent and must accept the increased cost of operation.

An object of the present invention is to provide tools for readily and economically accomplishing as much tilling as can be mechanically carried out with present day machines and with the greatest possible decrease in the requirement for manual labor.

The most economical of farm machinery is the tractor because of its speed and convenience of operation and maintenance. Accordingly, tractors are rapidly becoming the principal motive power for cotton farming operations. However, prior to the present invention, all plows and tillage implements for row crop tillage were designed to be propelled by animal power at low speed. In most cases, not more than two animals were used, which of course could not endure more than a two horse power sustained load. Present day farm tractors have ratings of 20 to 40 horsepower and are capable of tilling row crops at speeds of 5 to 10 miles per hour. Two facts are at once obvious; (1) any and all plows or shapes and their supports (standards) designed for a working load of two horsepower are entirely too flimsy and insecure to be subjected to a twenty horsepower load; and (2), all such plows and shapes that are designed to turn or roll sufficient soil at animal plowing speed (approximately 1 mile per hour) will throw too much soil, too far, if run at a tractor cultivating speed of 6 miles per hour. Therefore, in order to achieve the necessary efficiency and economy inherent in the greater source of power of the farm tractor, adequate cultivating plows for such speed and power must be provided. An object of the present invention is to provide such means.

The tools of the present invention are particularly adapted for use with tractors, and the tractor is the recommended machine for actuation of the tools. Because of the limitations on tractors, the tools of the invention cannot be utilized to their complete capabilities, but even so, the tools are adapted for use to greatly decrease the amount of manual labor required in the tilling of row crops, to substantially eliminate human error in crop cultivation and to properly and effectively till the soil about the crop plants.

It is an object of the present invention to provide tools for the shallow cultivation of row crops, which tools are readily maintained in an adjusted position for rapid travel through a crop field to increase the speed and effectiveness of tilling of crops.

Another object of the present invention is the provision of tilling blades and a standard therefor, which standard is adapted for ready and convenient securement to conventional tractor attachments.

A further object of the present invention is the provision of tilling blades and a standard therefor, the blades and standard being adapted for adjustment with respect to one another and with respect to the means for driving same to provide a plurality of tilling capabilities.

A still further object of the invention is the provision of tilling blades and a standard therefor, the blades and standard having an established relationship therebetween whereby the blades may be run close to the crop plants without danger of the blades swinging into the plants to damage same.

The problems met and overcome by the present invention have existed since the advent of the plow and we are aware of various endeavours over the years to produce tools capable of accomplishing the effective results of the tools and standard of the present invention. Among these are the cultivator blades and standards disclosed in Patent 309,361 to L. A. Ruhl and in Patent 1,799,519 to W. F. Laube.

It is an object of the present invention to provide tools that overcome the disadvantages of prior cultivating tools and that are capable of shallow tilling for barring-off, for dirting up and for producing a mulched surface on the crop field to effectively till the field without injury to the crop plants thereon.

Other objects and advantages of the present invention will become apparent in the following detailed description of preferred embodiments of the invention, wherein reference is made to the accompanying drawings, in which:

Figure 1 is a front elevation of the standard and one of the tilling blades of the present invention; showing same attached to a conventional plow beam;

Figure 2 is a side elevation of the apparatus shown in Figure 1;

Figure 3 is a plan view of the apparatus shown in Figures 1 and 2;

Figure 4 is an elevation of the lower surface of the standard, the view being taken substantially on line 4—4 of Figure 2;

Figure 5 is a plan view of the standard and a modified tilling blade of the present invention, showing the manner in which the standard and blade are pivoted about the axis of the attachment portion of the standard;

Figure 6 is a rear view, partly in elevation and partly in section, of a pair of tilling blades and standards of the present invention attached to plow beams and a conventional tractor cross beam and shown in position for tilling of a crop plant, the view showing the two embodiments of the tilling blades of the present invention in dirting up position with the blades slightly delined at the front end and angled laterally toward the plant row at the rear end, the soil moving plane surface being toward the plant row; and Figure 7 is a front view of the blades and standards shown in Figure 6, showing the blades and standards in a position adapted for cross plowing and barring- off with the blades slightly raised at the front end and angled laterally away from the retained plant at the rear end, the soil moving plane surface being away from the retained plant.

Referring to the drawings, and particularly to Figures 1 and 4, the invention is shown as comprising a standard 10 and a tilling blade 12. The standard 10 comprises a unitary piece of metal having a substantially cylindrical standard portion and a flattened foot. The standard portion includes a first, straight section 14 adapted for attachment to a conventional plow beam, an inclined intermediate portion 16 projecting to one side of the axis of the straight portion 14 and a curved portion 18 inclined oppositely to the inclined portion 16 and connecting the inclined portion 16 and the flattened foot 20. The inclined portion 16 and the curved portion 18 constitute offset portions of the standard for connecting the straight section 14 and the foot 20. The relationship of the curved portion 18 is preferably such with respect to the foot 20 and the inclined portion 16 as to connect the portion 16 and the foot 20 at approximately right angles to one another. The relationship may be varied as desired, but it is preferably such as stated, with the foot 20 extending at approximately 45° to the straight section 14 of the standard. The foot 20 has a flat upper face, as is shown, and the curved portion 18 extends rearwardly of and beneath the flat upper face of the foot so as to provide or present a recessed portion or depression 22 between the inclined portion 16 and the foot 20. The purpose of the depression 22 will be pointed out more fully hereinafter.

The flattened foot 20 is adapted for the reception of a tilling blade 12 and, for purposes of detachably and adjustably securing a blade to the foot, the foot is provided with an aperture or hole 24 adjacent its inner end and an arcuate slot 26 adjacent its free outer end. The spacing between the slot 26 and the aperture 24 is such that the aperture constitutes the axis of curvature of the slot 26. The hole 24 and the slot 26 are adapted for the reception of suitable fasteners and the lower surface of the foot 20 about the slot 26 is roughened in a suitable manner, as indicated at 28, for cooperation with a fastener to prevent slipping thereof.

The standard 10 is adapted for the reception of any one of a plurality of tilling blades, two preferred forms of the tilling blade of the present invention being shown herein, the first being shown in Figures 1 to 3 and at the left in Figure 6 and the other being shown in Figure 5 and at the right in Figure 6. The first form 12 of the tilling blade of the present invention comprises a generally rectangular plate 30 which may be provided with inclined side edges 32 if desired. The rectangular plate 30 is sharpened at one longitudinal edge thereof to provide a cutting edge 34. A pair of aligned apertures or holes are provided in the plate along the transverse axis thereof, the holes being spaced apart by a distance equal to the spacing between the hole 24 and the slot 26 in the foot 20 and being disposed substantially centrally of the plate 30. The holes in the plate 30 preferably each comprise a conical entry portion adjacent the upper surface of the plate and a polygonal lower portion.

The holes in the plate and the aperture 24 and the slot 26 in the foot 20 are adapted for the reception of suitable fasteners, which preferably are in the form of bolts 40 and 42 having heads formed complementary to the holes provided in the plate 30. In other words, the heads of the bolts have a conical portion adapted to seat within the conical portion of the apertures in the plate and a polygonal portion fitting within the polygonal portion of the apertures in the plate to restrain the bolts against rotation with respect to the tilling blade. The blade is shown as preferably formed from a flat plate, but variations may be made in the blade and in the foot so that the central portion of the blade is adapted to be received conformably on the upper surface of the foot.

The upper bolt 40 is adapted to be passed through the upper aperture in the blade and through the hole 24 in the foot of the standard to provide a pivotal axis about which the blade may be moved with respect to the foot. The lower bolt 42 is adapted to be received in the lower aperture in the blade and in the slot 26 in the foot to accommodate angular adjustment of the blade with respect to the foot of the standard. The extent of the arcuate slot 26 in the foot 20 is preferably such as to provide for angular adjustment of the blade with respect to the foot throughout an arc of aproximately 60°, 30° to either side of a position in which the blade is positioned normal to the foot and the standard. The fasteners 40 and 42 provide for the ready attachment and detachment of the blade with respect to the standard and, when loosened, for the ready and convenient angular adjustment of the blade with respect to the foot. The roughened lower surface 28 on the foot 20 about the arcuate slot 26 provides for a firm, anti-slip engagement between the foot and the fastener 42 to prevent accidental maladjustment or readjustment of the blade with respect to the standard.

The blades 12 may be provided, if desired, with one or more holes 44 adapted for the reception of additional devices, such for example, as an arcuate scoop or mold board for use in dirting up operations.

As is clearly shown in Figures 2 to 5, the relationship between the blade, the holes in the blade, the aperture 24 and the slot 26 is such that the cutting edge 34 of the blade 12 is spaced outwardly of the free outer end of the foot 20 and in alignment with the axis of the straight portion 14 of the standard 10. That is, the cutting edge of the blade 12 projects forwardly of the foot 20 to the axis of the straight section 14 so that the central portion or point of the cutting edge will lie immediately beneath the axis of the straight section 14, or, when the blade is angularly adjusted with respect to the foot, that the point or portion of the blade in alignment with the longitudinal axis of the foot 20 will lie substantially immediately beneath the axis of the straight section 14. As will be described more fully hereinafter, the standard and blade are mounted on a conventional plow beam by means of the straight section 14 and in such manner that the blade and standard may be rotated about the axis of the straight section 14. Accordingly, it will be appreciated that due to the disposition of the blade centrally on the foot with the cutting edge thereof aligned with the axis of the section 14, the torque on the straight section 14 of the standard 10 can be no greater than a function of one-half of the length of the tilling blade. Due further to the central disposition of the blade on the foot, each side of the cutting blade will tend to counteract the application of force on the other side thereof with a resulting tendency to balance out any torque loads placed on the standard 14. However, should substantial torque be exerted on the standard 14 so that same should tend to rotate in the means connecting it to a conventional plow beam, the degree of movement experienced by rotation of the blade out of its adjusted position will not be such as to swing the blade into the crop plant row, as is clearly shown in Figure 5. Accordingly, rotation of the blade and standard cannot result in the accidental or unintended destruction of crop plants.

The second embodiment of the tilling blade of the present invention is shown in Figure 5 and at the right of Figure 6 and is indicated generally by the reference numeral 46. The blade 46 is substantially identical to the blade 12 and is preferably formed from a substantially flat plate. The blade 46 differs from the blade 12 in that the top portions of the blade are cut away to either side of the central portion thereof, as at 48 and 50, to reduce the width of the blade to render same more particularly adapted for light tilling and barring-off operations.

The standard 10 is adapted to be secured in any conventional manner to a conventional plow beam, but a preferred means of attaching the standard to the beam is shown in Figures 1 to 3 and 6, wherein the standard 10 is shown as secured to a conventional plow beam 52 by means of a clamp, indicated generally at 54. The clamp 54 preferably comprises a body portion 56 having a bore therethrough and being split, as at 58, from one edge thereof into the bore, to define a split ring clamp adapted to be releasably and adjustably secured to the plow beam 52 by means of suitable fasteners, in the form of bolts 60, extending through the split portion of the body. At one side thereof, the body portion 56 is provided with a first protruding lug 62 defining an arcuate, substantially semicircular recess adapted for the reception of the cylindrical straight portion 14 of the standard 10. Immediately below the lug 62 and in alignment therewith is positioned the eye of an eye bolt 64. The eye of the bolt is adapted for the reception of the cylindrical straight section 14 of the standard 10 and is provided with a bolt shank extending through the body portion 56 and bolted thereto by means of a nut 66. The body portion 56 is provided with a second lug 68 adapted to engage the eye bolt 64 to prevent rotation thereof with respect to the body. In use, tightening of the nut 66 on the bolt shank of the bolt 64 will effect movement of the straight section of the standard into engagement with the arcuate recess in the lug 62 to secure the standard to the clamp 54. The body portion 56 of the clamp is provided with a suitable threaded bore extending transversely of the main bore and adapted for the reception of a set bolt 70 extending through the threaded bore and into engagement with the plow beam 52 to assist in securing the clamp and the standard to the beam in adjusted position. As is shown in Figure 6, the plow beams 52 are adapted to be connected in a conventional manner to the cross beam 74 of a conventional row crop plow or cultivator which may be tractor or animal driven, but which is preferably tractor driven.

The standard and blades of the present invention may be formed of a plurality of sizes and shapes. Preferably, however, the standard is formed of solid cylindrical stock having a diameter of from one and one-quarter inches to one and one-half inches and is preferably forged. The length of the standard from the upper end of the straight section 14 to the tip of the foot 20 is preferably approximately twenty inches to provide for adequate clearance of the plow beams 52 with respect to the plants. The blade 12 is preferably formed from three-sixteenths or one-quarter inch steel plate in the form of a rectangle approximately four and one-half inches wide and sixteen to eighteen inches long. The blade 46 is preferably formed from the same stock as the blade 12 with the portion thereof adapted for attachment to the foot 20 being four and one-half inches wide and the reduced side portions thereof being approximately three inches width. The blade 12 is adapted for use particularly in dirting up operations and for utilization in initially cross plowing a field of row sown crop plants. The blade 46 is particularly adapted for barring-off operations and for utilization in row and cross tilling after the initial cross plowing operation has been performed.

In operation or use of the standard and tilling blades of the present invention, the cross beam 74 is suitably mounted on a conventional tractor and a plurality of plow beams are suitably mounted in a customary manner on the cross beam. The plow beams 52 are so adjusted that two beams will extend into each row middle, with each of the two beams being positioned adjacent one row of plants. A standard 10 is clamped to each plow beam in the manner described hereinbefore and the standard may be rotatably adjusted as desired. According to the operation to be then performed, a suitable tilling blade is secured to the foot 20 of the standard and angularly adjusted thereon to effect the tilling operation to be performed. The blades are so mounted and adjusted on the standards and the standards are so mounted and adjusted on the plow beams 52 that the blades positioned on opposite sides of a single row of plants are spaced apart by a distance of approximately six inches so that each blade passes within approximately two and one-half inches of the crop plants. Bearing in mind that the preferable spacing between adjacent plant stands is thirty-three and forty inches, respectively, and that the blades are preferably each sixteen to eighteen inches in length, it will be apparent that the tilling blades 12 and 46 are only capable of plowing up a portion of the middle adjacent a plant row. Accordingly, in carrying out tilling operations with the blades and standards of the present invention, a suitable sweep is preferably mounted to one of the plow beams 52 between the blades passing through each middle so that the sweep will till the portion of the middle that is not tilled by the tilling blades of the present invention. It is preferred that a winged sweep be utilized for this purpose and suitably connected to one of the plow beams in trailing relation with respect to the tilling blades of the present invention.

As will be apparent from the foregoing, each of the tilling blades is adapted for rotatable adjustment about the axis of the straight section 14 of the standard 10 and for pivotal adjustment about the fastener 40 through the path defined by the arcuate slot 26. For dirting up operations, the tilling blades are preferably set as shown in Figure 6, wherein the blades are disposed at an angle of approximately 45° with respect to the row to be tilled and with the blades set at approximately 20° to the horizontal, with the rear end thereof raised and the forward end thereof lowered, so that as the blades pass through the soil, soil loosened thereby will be directed, due to the inclination and positioning of the blades, into the crop row to cover and smother any weeds growing within the crop row. The blade 12 is preferred for dirting up operations and when so used, it is convenient to suitably secure a rounded scoop or mold board to the upper edge of the trailing portion of the blade, by means of the apertures 44 in the blade, so that the soil loosened by the blades will be directed into the crop rows beneath the foilage of the crop plants so as to bury only the weeds and not the plants themselves. For barring-off and for cross plowing, the blades are preferably set, as is shown in Figure 7, in a reverse position from that described above. That is, the standard 10 is rotated approximately 90° so that the leading end of each blade is disposed near the crop plants and is elevated with respect to the rear end of the blade and so that the rear end of each blade trails at approximately 45° away from the crop plants. When set in this manner and passed through the soil, the hereinbefore described downward, slicing, sloping cut, essential to cross plowing, is produced and without injury to the stand, the crop plants or their roots. The blade 46 may be preferred for barring-off operations, since same has less surface and will therefore present less resistance to movement and furthermore will more readily accommodate the flow of loosened soil materials over the upper surface and off the upper edge thereof to produce a uniform mulched surface on the field.

Referring now to Figure 6, a cotton plant is indicated generally at 80 as having a tap root 82 and a plurality of arterial laterals 84. As is indicated in the figure, the arterial laterals 84 extend radially from the tap root within a few inches of the earth's surface. As pointed out hereinbefore, tilling must be carried out in such manner as to avoid injury to the arterial laterals since they constitute the principal feeding conduits of the root system of the plant. Accordingly, the plow beams 52 are set in a customary manner so that the tilling blades of the invention will having a draft or engagement within the soil of less than two inches to avoid injury to the laterals. Preferably, the blades are set to one inch or less. Due to the minimum draft of the blades in the soil, the blades will present little resistance to movement, and, accordingly, the blades may be moved relatively rapidly through the field. When tractor driven, it is preferred that the tractor be driven at a rate of four to six M. P. H. during tilling operations since the tractor can be steered with a greater degree of accuracy at higher speeds than at lower speeds. The high speed of cultivation is accomplished as a result of the sliding engagement and minimum draft of the cutting blades and will result in effectively severing all weeds and undesirabe plant growth in the row middles and in producing a stream of material for dirting up operations. Due further to their minimum draft, configuration and angle of inclination with regard to the earth's surface, the tilling blades of the present invention have no predominate tendency to dig deeper into the earth's surface and, accordingly, no particular strain is placed upon the various mechanisms of the tractor utilized to drive the tilling blades.

In Figure 7, we have shown a pair of blades set in a barring-off or cross plowing position and passing through a plant drill in a cross plowing operation. A plurality of seedling cotton plants disposed in a drill are indicated at 90. Preferably, the field has been row cultivated, in much the manner shown in Figure 6, prior to the cross plowing shown in Figure 7. In cross plowing, the object is to eliminate or destroy undesired cotton plants and to produce a uniform stand of retained plants. This is preferably accomplished, as pointed out hereinbefore, by cross plowing thirty-three inch swaths across the drills. The portion of each swath adjacent each retained plant hill is formed with one of the blades of the present invention, which effect the cut essential to the definition of a uniform plant stand. The plant or plants to be retained in a hill are indicated at 92, the blades 12 and 46 cutting away the undesired plants and directing same away from the plant hill.

By planting cotton seed in drills spaced forty inches apart and cross plowing in thirty-three inch swaths, as pointed out hereinbefore, adequate room is provided for the passage of a tractor through the cotton field until the plants approach maturity. When the plants reach full maturity, however, the entire area of the field is covered or obscured by plant foliage so that passage of a tractor through the field immediately before or at the time of maturity is impossible without resulting in damage to or destruction of the crop plants. Accordingly, the entire field, when the stand relationship stated is adhered to, will be utilized to practically its greatest extent and yet will provide adequate room for mechanical row and cross tilling to the greatest possible extent. The tools of the present invention, due to their minimum draft, provide for a high speed of operation so that row and cross tilling may be accurately and adequately carried out through all stages of the growth of the plant up to a period slightly in advance of maturity of the plants, at which time mechanical tilling must cease due to the inadequacies of conventional tractors. The use of the tilling blades of the present invention for carrying out dirting up operations and row tilling will result in killing all undesirable plant growth by severing the growth in the row middles and smothering undesirable growth in the plant rows. Barring-off in subsequent row tilling and in cross tilling will result in the destruction by severing of all undesirable plant growth occurring in all of the space about the individual plant hills within two and one-half inches of the plants. Accordingly, it will be appreciated that substantially all undesirable plant growth will be destroyed by proper utilization of the tools of the present invention in machine operations to reduce to an absolute minimum the necessity for hand tilling to thereby reduce the cost of production of cotton.

Referring now to the standard and particularly to the curved portion 18 thereof, it will be apparent that if the inclined portion 16 were in direct contact with the rear edge of the blade 12 or 46, moist soil would accumulate on the blade due to the blocking action of the inclined portion 16 with the result that the blade would become jammed with moist earth material and would not be fully effective for tilling operations. By providing the curved portion 18 presenting the depression 22, the standard is spaced rearwardly of and beneath the upper surface of the cutting blade and all materials, whether moist or dry, will readily flow over the surfaces of the blades and will not tend to accumulate thereon. Accordingly, the depression 22 provides for increased use and facility of the standards and tilling blades of the present invention.

Considerable emphasis has been placed herein upon the proper tilling of cotton, but it will be appreciated that the foregoing description applies equally well to the tilling of other crops for the purpose of destroying undesirable plant growth.

While we have described what we regard to be preferred embodiments of our invention, it will be apparent that modifications and rearrangements may be made therein without departing from the scope of the invention, as defined by the appended claims.

We claim:

1. A standard for cultivator tools comprising a unitary piece of metal having a standard portion and a flattened foot, said standard portion including a straight section adapted for attachment to a drive means and offset portions connecting said straight section and said flattened foot in inclined relation, the free outer end of said foot being disposed to the side of the axis of said straight section to which said offset portions extend, said foot presenting a flat upper surface, said offset portions being disposed rearwardly of and the lower end thereof beneath said flat upper surface of said foot, said foot having an arcuate slot therein adjacent the free outer end thereof and an aperture spaced upwardly and inwardly from said slot, said aperture defining the axis of curvature of said slot.

2. A standard for cultivator tools comprising a unitary piece of metal having a substantially cylindrical standard portion and flattened foot, said cylindrical standard portion including a first portion adapted for attachment to a drive means, a second portion inclined with respect to said first portion and a curved portion connecting said inclined portion and said foot, said curved portion being so shaped as to dispose said foot at an inclination opposite that of said inclined portion and inclined at approximately 45° to said first portion, the free outer end of said foot being disposed to the side of the axis of said first portion to which the said inclined portions extends, said foot presenting a flat upper surface, said curved portion being disposed rearwardly of and the lower end thereof beneath said flat upper surface of said foot, said foot having an arcuate slot therein adjacent the free outer end thereof provided with serrations thereon and an aperture spaced upwardly and inwardly from said slot, said aperture defining the axis of curvature of said slot, the lower surface of said foot adjacent the margins of said slot being roughened.

3. A cultivating tool comprising a standard and a blade adjustably and detachably secured to said standard, said standard comprising a unitary piece of metal having a substantially cylindrical standard portion and a flattened foot, said cylindrical standard portion including a straight section adapted for attachment to a drive means and offset portions connecting said straight section and said flattened foot in inclined relation, the free outer end of said foot being disposed to the side of the axis of said first portion to which said offset portions extend, said foot presenting a flat upper surface, the connecting portions of said offset portions being disposed rearwardly of and the lower end thereof beneath said flat upper surface of said foot, said blade comprising a plate having a flat lower surface portion adapted to engage said flat upper surface of said foot, said plate being mounted centrally on said foot and generally transversely thereof, said blade having a cutting edge portion projecting beyond the free outer end of said foot, approximately the central point of the cutting edge of said blade being positioned beneath the axis of said straight section, and the edge of said blade remote from said cutting edge extends rearwardly of said foot portion over a portion of said curved portion.

4. A cultivating tool comprising a standard and a blade adjustably and detachably secured to said standard, said standard comprising a unitary piece of metal having a substantially cylindrical standard portion and a flattened foot, said cylindrical standard portion including a first portion adapted for attachment to a drive means, a second portion inclined with respect to said first portion and a curved portion connecting said inclined portion and said foot, said curved portion being so shaped as to dispose said foot at an inclination opposite that of said inclined portion and inclined to said first portion, the free outer end of said foot being disposed to the side of the axis of said first portion to which said inclined portion extends, said foot presenting a flat upper surface, said curved portion being disposed rearwardly of and the lower end thereof beneath said flat upper surface of said foot, said foot having an arcuate slot therein adjacent the free outer end thereof and an aperture spaced upwardly and inwardly from said slot, said aperture defining the axis of curvature of said slot, said blade comprising a plate mounted centrally on said foot generally transversely thereof, said blade having a portion extending rearwardly of said foot over the lower free end of said curved portion and having a cutting edge portion projecting beyond the free outer end of said foot, said blade having a pair of holes therein along the central transverse axis thereof spaced apart a distance equal to the spacing between said aperture and said slot in said foot, a fastener extending through one hole in said plate and said aperture in said foot, and a second fastener extending through the other hole in said plate and said slot in said foot, said fasteners detachably securing said blade to said foot, said fasteners when loosened accommodating angular adjustment of said blade with respect to said foot and said standard by pivotal action of said blade about said first fastener and movement of said second fastener through said slot in said foot, the cutting edge of said blade being disposed forwardly of the free outer end of said foot so that the portion of the cutting edge aligned with the longitudinal axis of said foot is positioned substantially beneath the axis of the said first portion of said standard.

5. A cultivating tool comprising a standard and a blade adjustably and detachably secured to said standard, said standard comprising a unitary piece of metal having a substantially cylindrical portion and a flattened foot, said cylindrical standard portion including a first portion adapted for attachment to a drive means, a second portion inclined with respect to said first portion and a curved portion connecting said inclined portion and said foot, said curved portion being so shaped as to dispose said foot at an inclination opposite that of said inclined portion and inclined at approximately 45° to said first portion, the free outer end of said foot being disposed to the side of the axis of said first portion to which the said inclined portion extends, said foot presenting a flat upper surface, said curved portion being disposed rearwardly of and the lower free end thereof beneath said flat upper surface of said foot, said blade comprising a generally rectangular plate having a flat lower surface adapted to engage the upper surface of said foot, said blade being mounted centrally and generally transversely of said foot and having a cutting edge portion projecting beyond the free outer end of said foot, said foot having an arcuate slot therein adjacent the free outer end thereof and an aperture spaced inwardly from said slot, said aperture defining the axis of curvature of said slot, said blade having a pair of holes therein along the transverse axis thereof spaced apart by a distance equal to the spacing between said aperture and said slot in said foot, a first fastener extending through one of said holes in said plate and said aperture in said foot to provide a pivotal axis for said blade, and a second fastener extending through the other hole in said blade and through said slot in said foot, said fasteners detachably securing said blade to said foot, said fasteners accommodating angular adjustment of said blade with respect to said foot and said standard when loosened by virtue of pivotal movement of said blade about said first fastener and movement of the second fastener in said slot in said foot, the lower surface of said foot adjacent the margins of said slot being roughened for cooperation with said second fastener, the cutting edge portion of said blade projecting approximately to the axis of said first portion of said standard so that approximately the central point of the cutting edge is disposed beneath the axis of said first portion.

References Cited in the file of this patent
UNITED STATES PATENTS

| | | |
|---|---|---|
| 309,361 | Ruhl | Dec. 16, 1884 |
| 385,275 | Leigh | June 2, 1888 |
| 402,196 | Ringwood | Apr. 30, 1889 |
| 432,452 | Taylor | July 15, 1890 |
| 455,834 | Swedberg | July 14, 1891 |
| 510,940 | Smith et al. | Dec. 19, 1893 |
| 538,655 | Butt et al. | May 7, 1895 |
| 677,694 | Perry | July 2, 1901 |
| 678,879 | Hill | July 23, 1901 |
| 888,635 | Morris | May 26, 1908 |
| 961,044 | Sutton | June 7, 1910 |
| 975,976 | Meyer | Nov. 15, 1910 |
| 1,099,304 | Katterhenry | June 9, 1914 |
| 1,107,856 | Simmons | Aug. 18, 1914 |
| 1,112,889 | Carter et al. | Oct. 6, 1914 |
| 1,368,744 | Norcross | Feb. 15, 1921 |
| 1,430,504 | Hiett | Sept. 26, 1922 |
| 1,438,583 | Curtiss | Dec. 12, 1922 |
| 1,543,894 | Wilson | June 30, 1925 |
| 1,633,232 | Sievers | June 21, 1927 |
| 1,799,519 | Laube | Apr. 7, 1931 |